Sept. 19, 1961    C. W. COCHRAN    3,000,066
MOLDING AND THE LIKE FASTENING DEVICES
Filed June 29, 1959
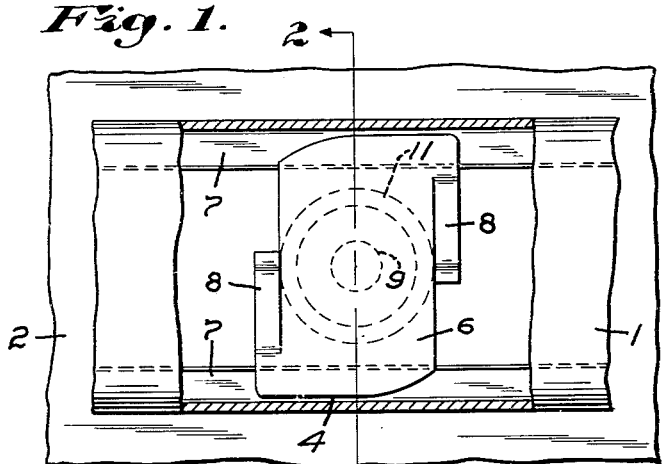
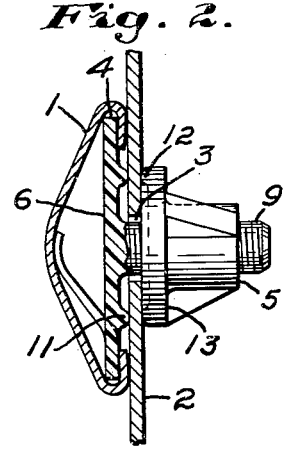
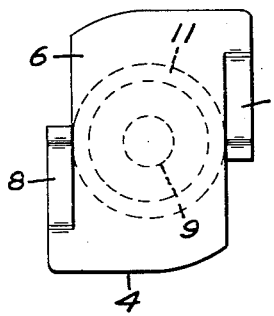
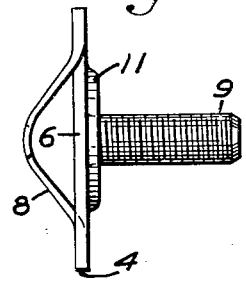
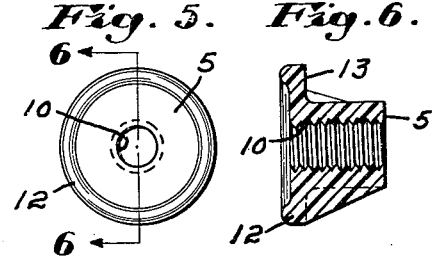
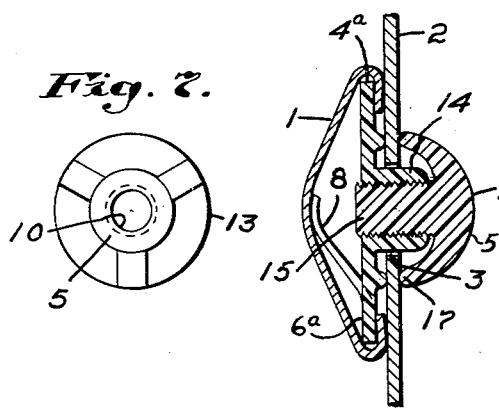
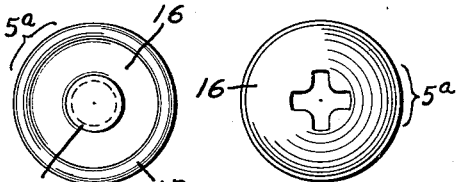
Inventor:
Clarence W. Cochran,
by Walter P. Jones
Atty.

United States Patent Office 3,000,066
Patented Sept. 19, 1961

3,000,066
MOLDING AND THE LIKE FASTENING DEVICES
Clarence W. Cochran, Belmont, Mass., assignor to United-Carr Fastener Corporation, Cambridge, Mass., a corporation of Delaware
Filed June 29, 1959, Ser. No. 823,540
2 Claims. (Cl. 24—73)

My invention aims to provide an improved fastening device for use in attaching a molding strip or the like in place on a support, as for example, a trim molding on the body of a motor vehicle.

An object of my invention is to provide a fastening device preferably formed of two cooperating pieces of injection molded plastic material.

A further object of the invention is to provide a fastening device that is corrosion resistant, reduces noise when vibrated, is simple and inexpensive in construction and has integral sealing means for preventing passage of moisture through an aperture in a support, such as the motor vehicle body.

It should be understood that the molding strip engaging part of my improved fastener may be any suitable shape and construction, such as the type that slides into one end of the molding strip, or the type that turns into place by insertion between the inturned under flanges of the strip, as will be understood by those skilled in the art.

In the drawings which illustrate preferred embodiments of my invention:

FIG. 1 shows a plan view of an installation partly broken away to illustrate one form of my invention;

FIG. 2 is a partial section taken on the line 2—2 of FIG. 1;

FIG. 3 is a plan view of the molding strip holding member;

FIG. 4 is an edge view of the device shown in FIG. 3;

FIG. 5 is a top plan view of an attaching member nut;

FIG. 6 is a section taken on the line 6—6 of FIG. 5;

FIG. 7 is a bottom plan view of the nut shown in FIGS. 5 and 6;

FIG. 8 is a section of a modified form of my invention showing a different construction of the nut and screw portion of the installation;

FIG. 9 is a bottom plan view of the modified form of attaching member shown in FIG. 8; and FIG. 10 is a plan view of the attaching member shown in FIG. 9.

My invention, as illustrated in FIGS. 1 through 7, shows a conventional trim molding strip 1 attached to a supporting sheet 2, having an aperture 3, by means of a two piece fastening device of a particular construction.

The fastening device includes a molding strip holding member 4 and an attaching member 5. While these members may be formed in various shapes, I prefer to form them of suitable injection molded plastic material, each being of a single piece construction, as illustrated in FIGS. 3, 4, 5 and 6.

My preferred strip holding member 4 has a plate-like portion 6 of oblong shape so that it may be entered into the molding 1 between the inturned flanges 7—7 and rotated to a position shown in FIG. 1. This plate-like portion 6 has yieldable fingers 8—8 for engaging an inner surface of the molding 1 [FIG. 2] and for holding the plate in a desired position. I have also formed the member 4 with an attaching portion 9, in this case a threaded stud, which passes through the aperture 3 in the support 2 [FIG. 2] and engages the attaching member 5. The attaching member is in the form of a threaded nut having an internally threaded shank portion 10 that receives the threaded stud 9 and holds the parts of the assembly together.

Since it is important in some installations to exclude moisture from passage through the aperture 3, I provide at least one sealing means on one of the members of the fastening device. In the device illustrated I provide a ring-like seal portion 11 on the under side of the plate-like portion 6 and a sealing ring-like portion 12 on the flange 13 of the attaching member 5. Thus, when the parts are tightly threaded together (as shown in FIG. 2), the sealing portions 11 and 12 are tightly compressed against opposite faces of the support 2 and they surround the aperture 3, thereby effectively sealing out the passage of moisture, dirt, etc.

In FIGS. 8, 9 and 10, I have shown a modified form of fastening device differing only as to the construction of the threaded interengaging fastening means for holding the parts together.

The fastening member 4a, in this case, has a tubular internally threaded shank 14 extending from the plate-like portion 6a (FIG. 8) and the attaching member 5a has a threaded stud 15 with a head or flange 16 semi-spherical in cross section so that its edge 17 provides one of the seals.

My improved fastening devices are so constructed that they are easy to use in the desired assembly of parts. They are simple, strong, will not corrode, and the threaded engagements make for strong self-adjustment attachments to various thicknesses of materials. By screwing the parts together, good seals are provided and the parts may be easily disassembled when necessary for repairs and replacements.

While I have illustrated and described preferred embodiments of my invention, they are best defined by the following claims.

I claim:

1. A fastening device for attaching molding strips and the like to suitable supports, said fastening device including a molding strip holding member formed entirely of molded plastic material and having a molding engaging plate-like portion and an attaching portion, said fastening device also including a molded plastic attaching member for cooperation with the molding holding member to hold a molding strip to a support and interengaging fastening means provided partly by the attaching portion of the molding strip-holding member and partly by the attaching member to secure the parts in assembly, and a sealing portion formed integral with each of said members of said attaching device to press against opposite faces of a support around an aperture in the support to seal the aperture against the passage of moisture.

2. A fastening device for attaching molding strips and the like to suitable supports, said fastening device including a molding strip holding member formed entirely of molded plastic material and having a molding engaging plate-like aperture-free solid portion and an attaching portion, said fastening device also including a molded plastic attaching member for cooperation with the molding holding member to hold a molding strip to a support, said attaching portion of said holding member being a threaded shank for passage through an aperture in a support and said molded plastic attaching member having a threaded shank for passage through the aperture in the support to threadedly engage the threaded shank of the attaching portion, said molded plastic attaching member having an integral flange shaped for sealing engagement with one face of a support around said aperture and said holding member having an integral sealing ring for engagement on the opposite face of the support around said aperture.

References Cited in the file of this patent

UNITED STATES PATENTS

| | | |
|---|---|---|
| 2,053,918 | Peretzman | Sept. 8, 1936 |
| 2,287,606 | Eady | June 23, 1942 |
| 2,308,134 | Westrope | Jan. 12, 1943 |
| 2,788,100 | Landell | Apr. 9, 1957 |
| 2,887,926 | Edwards | May 26, 1959 |

FOREIGN PATENTS

| | | |
|---|---|---|
| 860,699 | Germany | Dec. 22, 1952 |
| 1,051,695 | France | Sept. 16, 1953 |